Figure 1:
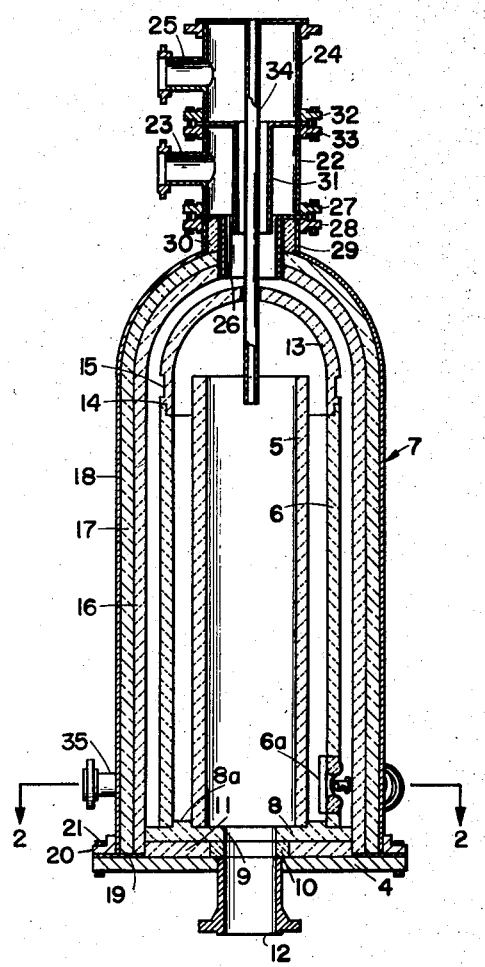

July 28, 1959     I. L. BREIER     2,897,063
REACTOR WITH CONCENTRIC ANNULAR PASSAGES
Filed Jan. 28, 1957

INVENTOR:
IRWIN L. BREIER
BY: *Oswald H. Milmore*
HIS ATTORNEY

United States Patent Office 2,897,063
Patented July 28, 1959

2,897,063

REACTOR WITH CONCENTRIC ANNULAR PASSAGES

Irwin L. Breier, Lafayette, Calif., assignor to Shell Development Company, New York, N.Y., a corporation of Delaware Application January 28, 1957, Serial No. 636,566

5 Claims. (Cl. 23—284)

This invention relates to a reaction vessel affording an elongated folded flow path for reactants which includes concentric sections through which the reactants flow in opposite directions so as to limit the overall length of the reactor. The reactor is especially, although not exclusively, suited to such reactions as those between hydrocarbons and iodine, either in the absence or presence of controlled amounts of oxygen, for the manufacture of butadiene from butane, and will be described in connection therewith. The invention further provides a solution to the problem of constructing a reactor of corrosion-resistant materials, such as ceramics or bricks.

Among the objects of the invention are: To provide a reactor which is constructed of sections such that they can be easily constructed and assembled; to reduce the overall length of the reactor; to facilitate maintenance by arranging the reactor to make it simple to gain access and make repairs thereto; to afford flexibility in operation by a combination of elements which mix the reactants effectively at varying flow rates and ratios and which make it possible to replace various tubes and mixing nozzles with corresponding parts of different dimensions; to promote temperature stability by arranging the successive traverses or sections of the reactant flow passages in mutual heat-exchange relation; to minimize heat losses by reducing the extent of outer surface; to provide a construction wherein the separate sections may undergo thermal expansion independently of one another, thereby eliminating or greatly ameliorating the problems incident to differential thermal expansions; and arrange the structure so that leakage through the inner partitioning tubes is not significantly deleterious, thereby permitting cheaper construction and reducing the need for maintenance.

In summary, the reactor comprises several spaced, concentric tubes, usually upright and constructed of corrosion-resistant ceramic or brick, providing intervening, concentric, axially elongated flow channels that are in serial communication at the ends of the channels so as to form an elongated folded flow channel composed of sections extending alternately in opposite directions, an inlet and outlet means for admitting a reactant at one end of the folded channel and discharging it at the other end thereof. The reactor can also be constructed entirely of metal when corrosion thereof by the reactants is not unduly severe. The reactor is preferably provided at the main inlet with means for admitting a plurality of reactants and auxiliary inlets are provided at the ends of the concentric tubes for progressively admitting a reactant, which may be the same as one of those admitted at the main inlet. The auxiliary inlet advantageously includes one or more nozzles directed tangentially into one of the annular channels for inducing circumferential flow of the reactants and thereby promoting mixing; this nozzle may further be disposed in spaced relation to the walls of openings piercing the adjacent tube so as to induce flow of the reactants between the adjoining concentric channels.

Figure 2:
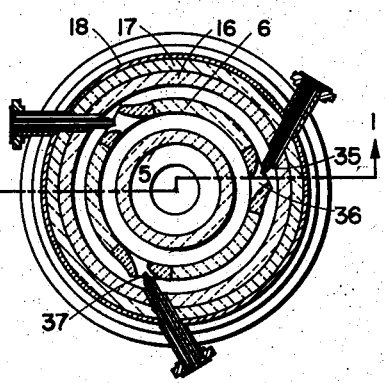

The invention will be further described with reference to the accompanying drawing forming a part of this specification and showing one preferred embodiment by way of example, wherein:

Figure 1 is a vertical sectional view through the reactor, taken on the line 1—1 of Figure 2, and Figure 2 is a transverse sectional view taken on the broken line 2—2 of Figure 1.

The reactor is supported on a base plate 4 which supports concentric tubes 5, 6 and 7. The inner and intermediate tubes 5 and 6 rest directly on an annular plate 8 which forms a floor plate closing the lower ends of the annular flow channels between the tubes and has an annular positioning ridge 8a; it has a central discharge port 9 aligned with a ring 10 which is set within a spacer plate 11 resting directly on the plate 4. The hole and ring are in registry with discharge opening in the plate which communicates with a nozzle 12. The intermediate tube 6 is surmounted by a closure dome 13 of like material and supported by a rabebted joint 14. This dome is advantageously of monolithic construction, and is in that case provided with a peripheral recess 15 to facilitate engagement and raising and lowering thereof. The outermost tube 7 is composite and includes: an inner lining 16, an intermediate layer 17, and an outer metallic shell 18. The upper part of this composite tube is dome-shaped and the bottom rests on a flanged metallic ring 19 which is welded to the metallic shell 18 and supported by the plate 4; it is secured thereto by a retaining ring 20 and bolts 21.

The parts 5, 6, 8, 10, 13 and 16 may be of suitable refractory material, depending upon the intended service; thus, acid-resistant cast or brick ceramic material or carbon may be used. The parts 11 and 17 are preferably composed of heat-insulating material, such as brick lining, especially cellular glass bricks.

The main inlet to the reactor includes a lower housing 22 having an inlet nozzle 23, and an upper housing 24 having an inlet nozzle 25. These housings communicate immediately with the space above the dome 13 through an axial opening in the dome-shaped upper part of the outermost tube. A lining sleeve 26 extends through this axial opening and has at the top a supporting flange which is clamped between flange rings 27 and 28, which are fixed, as by a welding, to the housing 22 and to a bushing 29, respectively. The latter bushing is fixed, e.g., welded, to the shell 18 and may contain a brick heat-insulating tube 30. A tubular partition member 31 extends centrally through the housing 22 into the sleeve 26 in radially spaced relation thereto and is supported at the top by an integral flange which is clamped between rings 32 and 33 which are fast on the housing sections 22 and 24, respectively. The latter housing is closed at the top by the wide flange which is integral at the top of an auxiliary inlet tube 34; this tube extends through the tubular partition member 31 and the sleeve 26 with radial clearance and thence through an opening in the top of the dome 13. The bottom of the tube 34 is open to emit a jet of fluid downwardly into the innermost tube 5.

A plurality of auxiliary inlet pipes 35 extend in sealed relation through the outermost tube 7 and are directed toward openings 36 in the intermediate tube 6. These pipes have nozzle or tip portions 37 directed coaxially with the openings 36 to discharge fluid substantially tangentially to the annular channel within the tube 6. The openings 36 are advantageously convergent-divergent as shown, whereby fluid discharged from the pipes 35 induce flow of reactants from the annular channel between the tube 6 and 7 inwardly through the openings 36. When the wall of the tube 6 is thin it is advantageous to form the openings 36 in special blocks 6a which are set into breaches in the tube 6 and made of similar material, as shown, and thereby increase the axial extent of the openings to improve the hydraulic characteristics. These auxiliary inlet pipes and the openings 36 may be arranged at more than one level to accommodate a greater total flow of the reactants.

The pipes 34 and 35 may be constructed of suitable corrosion-resistant material such as special alloys, platinum, cast metal, ceramic or carbon, as dictated by the properties of the reactants.

In operation, as used for example in the production of butadiene from butane, vaporized iodine and butane are admitted through the inlet nozzles 25 and 23, respectively, and come into contact and are mixed within the lower section of the sleeve 26. Oxygen may be admitted with the iodine. The reactants flow thence over the outer surface of the dome 13 and downwardly through the outermost annular channel between the tubes 6 and 7. They flow thence through the holes 36 into the bottom of the intermediate annular channel between the tubes 5 and 6. Supplemental oxygen is admitted through the pipes 35; this flows as jets and thereby promotes the flow of the reactants through the holes 36 by induction and further sets up a peripheral flow of the fluids through the intermediate annular channel, thereby promoting mixing. The reactants flow thence upwardly with a helical motion to the dome 13, again reverse flow direction, and descend through the innermost tube 5. At the top of the latter additional oxygen is admitted downwardly through the pipe 34 as a central axial jet which is rapidly mixed with the other reactants. The reacted mixture is discharged through the port 9, ring 10 and nozzle 12.

It is evident that the reactor can be easily assembled and disassembled; after separating the rings 27 and 28, removing the housings 22 and 24, and withdrawing the pipes 35, the outermost tube 7 can be hoisted from the plate 4 by means of the ring 28. The dome 13 and tubes 5 and 6 can then be removed in succession.

Auxiliary inlet tubes 35 of different diameters at the nozzle ends can be readily substituted to attain the desired mixing efficiency and to adapt the reactor to varying flow rates.

The two inner tubes 5 and 6 can be made of relatively thin walls, such as graphite, to effect a good heat-transfer between the annular spaces separated thereby and promote temperature stability within the reactor.

It is evident that each of the several tubes may undergo thermal expansion independently of the others; thereby problems associated with differential expansion are avoided.

Finally, it should be noted that even large leaks can be tolerated between the flow channels partitioned by the inner tubes 5 and 6. Such leakage would merely by-pass a part of the reactor and tend to reduce the conversion somewhat but would not create a hazard.

I claim as my invention:

1. A reactor comprising several concentric, radially spaced, tubes defining therebetween at least two outer and one central, axially elongated flow channels, said tubes providing flow passageways situated alternately at opposite ends of consecutive tubes and placing the said flow channels into serial communication to form a folded channel, transverse wall means for each tube other than the innermost, said wall means closing the end of the respective tube which adjoins a flow passageway in communication with an adjoining inner flow channel, thereby confining said flow spaces for serial flow of reactants in alternating axial directions, inlet means at one end of said folded channel, outlet means at the other end of said folded channel, and an auxiliary inlet at the closed end of at least one of said tubes.

2. A reactor according to claim 1 including an auxiliary inlet at the closed end of each of said tubes other than the innermost tube.

3. A reactor comprising several concentric, radially spaced, upright tubes defining therebetween at least two outer and one central, axially elongated flow channels, said tubes providing flow passageways situated alternately at opposite ends of consecutive tubes placing the said flow channels into serial communication to form a folded channel, at least one of said tubes other than the outermost having an opening therethrough constituting the said passageway between flow channels, transverse wall means for each tube other than the innermost, said wall means closing the end of the respective tube which adjoins a flow passageway in communication with an adjoining inner flow channel, thereby confining said flow spaces for serial flow of reactants in alternate directions, inlet means at one end of said folded channel, outlet means at the other end of said folded channel, and an auxiliary inlet pipe having nozzle means directed into said tube opening for mixing fluid admitted through the auxiliary pipe with said reactant.

4. A reactor according to claim 3 wherein said nozzle means are disposed substantially tangentially to the inner surface of said one tube.

5. A reactor comprising a central, vertical, open-ended tube, an intermediate tube surrounding said central tube in radially spaced relation and having a closure dome in spaced relation above the top of the central tube, an outer tube surrounding said intermediate tube in radially spaced relation, an annular floor connecting the lower ends of the central and outer tubes, the intermediate tube providing at the bottom thereof a flow passageway for flow of reactants from the space outside the intermediate tube into the space within the intermediate tube, a closure dome for the top of the outer tube, an inlet for admitting a reactant including a pipe extending downwardly through the top of the last-mentioned dome and opening into the space beneath said last-mentioned dome, an auxiliary inlet pipe extending downwards concentrically with the said inlet through the first-mentioned dome and opening into the space beneath said first-mentioned dome, and an outlet for discharging reacted materials from said central tube.

References Cited in the file of this patent
UNITED STATES PATENTS

| | | |
|---|---|---|
| 1,920,886 | Pier et al. | Aug. 1, 1933 |
| 2,051,363 | Beekley | Aug. 18, 1936 |
| 2,509,267 | Goodwin | May 30, 1950 |
| 2,747,974 | Felger | May 29, 1956 |